US006992121B1

United States Patent
Peters et al.

(10) Patent No.: US 6,992,121 B1
(45) Date of Patent: Jan. 31, 2006

(54) AQUEOUS, POLYMODAL, MULTISTAGE POLYMER EMULSIONS

(75) Inventors: Antonius Carolus Ida Adrianus Peters, Waalwijk (NL); Gerardus Cornelis Overbeek, Waalwijk (NL)

(73) Assignee: DSM IP Assets B.V., Geleen (NL)

( * ) Notice: Subject to any disclaimer, the term of this patent is extended or adjusted under 35 U.S.C. 154(b) by 449 days.

(21) Appl. No.: 10/130,479

(22) PCT Filed: Nov. 16, 2000

(86) PCT No.: PCT/EP00/11349

§ 371 (c)(1),
(2), (4) Date: May 20, 2002

(87) PCT Pub. No.: WO01/38412

PCT Pub. Date: May 31, 2001

(30) Foreign Application Priority Data

Nov. 20, 1999 (GB) .................................. 9927432

(51) Int. Cl.
*C08L 51/00* (2006.01)
*C08K 9/00* (2006.01)

(52) U.S. Cl. ...................... 523/206; 523/201; 524/504; 524/558; 524/833

(58) Field of Classification Search ................ 523/201, 523/206; 524/504, 558, 833
See application file for complete search history.

(56) References Cited

U.S. PATENT DOCUMENTS

| 4,254,004 A | 3/1981 | Abbey |
| 4,456,726 A | 6/1984 | Siol et al. |
| 4,539,361 A | 9/1985 | Siol et al. |
| 4,567,099 A | 1/1986 | Van Gilder et al. |
| 5,726,259 A | 3/1998 | Hayes et al. |

FOREIGN PATENT DOCUMENTS

| DE | 196 36 490 A1 | 3/1998 |
| EP | 0 728 779 A2 | 8/1996 |

*Primary Examiner*—Tae H. Yoon
(74) *Attorney, Agent, or Firm*—Pillsbury Winthrop Shaw Pittman

(57) ABSTRACT

Aqueous emulsion of a polymodal multistage polymeric material, wherein:
(i) at least 50% of the polymodal multistage polymeric material comprises the polymers of at least two polymerisation stages having a Tg difference of $\geq 20°$ C., more preferably $\geq 40°$ C., and most preferably $\geq 60°$ C.;
(ii) at least 50% of the polymodal multistage polymeric material comprises the polymers of at least two polymerisation stages having a Dw differing by $\geq 50$ nm, preferably $\geq 80$ nm and more preferably $\geq 100$ nm; and
(iii) the means to form at least one of the differing Tg's in (i) and at least one of the differing Dw's in (ii) are carried out in different stages of the multistage polymerisation to form the polymeric material.

The polymer emulsion is useful for protective coatings, printing inks, overprint lacquer formulations, polishes, varnishes, sealants, paint formulations and adhesives.

19 Claims, No Drawings

AQUEOUS, POLYMODAL, MULTISTAGE POLYMER EMULSIONS

CROSS REFERENCE TO RELATED APPLICATIONS

This application is a national phase application based on PCT/EP00/11349, filed Nov. 16, 2000, and which further claims priority from British Application No. 9927432.6, filed Nov. 20, 1999. These applications in their entirety are incorporated herein by reference.

The present invention relates to an aqueous emulsion of a polymodal multistage polymeric material, to the polymodal multistage polymeric material derived from said emulsion, particularly in the form of a coating, and to a process for making an aqueous emulsion of a polymodal multistage polymeric material.

By polymodal in respect of a polymodal multistage polymeric material is meant that the polymeric material contains particles with (or grouped around) at least two different and distinct maxima in its particle size distribution cure (weight % or intensity=ordinate or y-axis, size=abscissa or x-axis), whereas monomodal in respect of a polymeric material means that the polymeric material contains particles with (or grouped around) a single maximum in its particle size distribution curve. By weight average particle size (Dw) is meant the diameter of the particle since the particles of a polymeric material are usually essentially spherical and for practical purposes are considered as preferably being spherical.

By multistage in respect of a polymodal multistage polymeric material is meant a polymeric material made by a multistage polymerisation process. By a multistage polymerisation process is meant the sequential polymerisation in two or more stages of two or more distinct and different monomer mixtures. Accordingly the term "polymeric material" herein conveys the notion that two or more polymers derived from the distinct and separate monomer mixtures in the two or more polymerisation stages are present.

The use of aqueous emulsions of polymers is well known in the art for numerous applications, for example for the provision of the binder material in coating formulations, waterborne printing ink and overprint lacquer formulations, as well as use in adhesive formulations.

WO96/19536 discloses an aqueous polymer emulsion comprising a hydrophobic polymer part with a polymodal particle size distribution (PSD) and an oligomer part bearing acid groups which is capable of imparting reversibility to the polymer of the emulsion as a whole. The hydrophobic polymer and oligomer parts may be prepared by blending each component or by an in-situ polymerisation process. The hydrophobic polymer part, when prepared by a multistage process has the large particles prepared first followed by the addition of a second monomer mixture also containing surfactant so as to change the particle size at the same time as polymerising the second monomer mixture, where the second monomer mixture may have the same or a different composition as the first monomer mixture.

EP 0376096 discloses aqueous polymer dispersions which contain sequentially formed polymers, formed in first and second stages with an average particle size (Dw) of less than 140 nm and with 5 to 45% of a hard first stage polymer with a glass transition temperature (Tg)>60° C. and 95 to 55% of a soft second stage polymer with a Tg<80° C., wherein the Tg of the second stage is 20° C. lower than the Tg of the first stage. (The Tg of a polymer is the temperature at which it changes from a glassy, brittle state to a plastic, rubbery state). The polymer particles however have a monomodal distribution.

U.S. Pat. No. 5,308,890 discloses a blend of at least two emulsion polymers, at least one of which is a multistage polymer and at least one polymer which does not form a film at ambient temperature. The multistage polymer has a first soft stage polymer and a hard second stage polymer and has a larger or the same particle size than the non film forming polymer. A problem with the use of blends however is that two separate dispersions have to be prepared and stored and it is difficult to prepare high solid containing blends of emulsion polymers with small particles, as small particles can usually only be made at a low solids content. Furthermore a lot of surfactant is usually required to make small particles which affects coating properties such as increasing water sensitivity, moisture vapour transmission rates and foaming.

In many coating applications, waterborne printing ink and overprint lacquer formulations, it is desirable for the aqueous polymer emulsion to possess, or provide in the resultant coating, a combination of various features and properties such as:

1) The capability of allowing a very high polymer solids content in the emulsion if desired, since this leads to fast drying to give a polymeric film coating and may lead to an increase in gloss in the resultant coating.
2) Good film formation (low minimum film forming temperature—MFFT).
3) Good block resistance (measured by the degree of which two coated surfaces tend to stick together).
4) The emulsion should have acceptably low viscosity for ease of application when using standard coating techniques.

The problem to be overcome therefore is to simultaneously achieve such properties or features in an aqueous polymer emulsion and the resultant coating.

We have now invented aqueous polymer emulsions which can provide very high solids contents if desired, have acceptably low viscosity, exhibit improved drying rates and improved film formation and show improved blocking resistance properties.

According to the present invention there is provided an aqueous emulsion of a polymodal multistage polymeric material, wherein:

(i) at least 50% by weight of the polymodal multistage polymeric material comprises the polymers of at least two polymerisation stages having a Tg difference of $\geq 20°$ C., more preferably $\geq 40°$ C., and most preferably $\geq 60°$ C.;

(ii) at least 50% by weight of the polymodal multistage polymeric material comprises the polymers of at least two polymerisation stages having a Dw differing by $\geq 50$ nm, preferably $\geq 80$ nm and more preferably $\geq 100$ nm; and (iii) the means to form at least one of the differing Tg's in (i) and at least one of the differing Dw's in (ii) are carried out in different stages of the multistage polymerisation to form the polymeric material.

It is to be understood that the polymerisation stages corresponding to the sequential polymerisation of a multistage process are preferably carried out in the presence of the previously formed polymerisation stages i.e. the process is an in-situ process.

The Tg of a polymer may be calculated by means of the Fox equation. Thus the Tg, in degrees Kelvin of a polymer having "n" polymerised types of monomers (comonomers)

is given by the weight fractions W of each comonomer and the Tg's of the homopolymer (in degrees Kelvin) derived from each comonomer according to the equation:

$$\frac{1}{Tg} = \frac{W_1}{Tg_1} + \frac{W_2}{Tg_2} + \frac{W_3}{Tg_3} + \ldots \frac{W_n}{Tg_n}$$

The calculated Tg in degrees Kelvin may be readily converted to degrees ° C. The means for forming polymers with differing Tg's is therefore carried out by varying the comonomers and/or weight fractions of the comonomers making up the monomer mixture for each polymerisation stage.

The means for forming polymers with differing Dw's are known in the art and include methods such as the addition of surfactant, changes in pH, addition of small sized seed lattices and changes in feed rate as described below.

Preferably at least 10%, more preferably at least 15%, most preferably at least 20% by weight of the polymodal multistage polymeric material comprises polymers having a Tg$\geq$50° C.

Preferably at least 40%, more preferably at least 50% by weight of the polymodal multistage polymeric material comprises polymer(s) having a Tg$\leq$30° C.

Preferably at least 60%, more preferably at least 70%, most preferably at least 80% by weight of the polymodal multistage polymeric material comprises the polymers of at least two polymerisation stages having a Dw differing by $\geq$50 nm.

According to the present invention there is also provided a method of preparing an aqueous emulsion of a polymodal multistage polymeric material comprising:
 i) in a first aqueous emulsion polymerisation stage forming a mixture of monomers and polymerising the mixture to form a first stage polymer having particles with a first Dw and a first Tg, and when the first stage is preferably substantially complete, introducing a particle size change means for effecting a change of Dw in a subsequent polymerisation; and
 ii) in a second aqueous emulsion polymerisation stage, forming a mixture of monomers and polymerising the mixture in the presence of the first stage polymer to form a second stage polymer with a second smaller Dw, and a first or second Tg which is the same or different to that of the first stage polymer; and
 (iii) in a third aqueous emulsion polymerisation stage forming a mixture of monomers and polymerising the mixture in the presence of the first and second stage polymers to form a third stage polymer in an aqueous emulsion in which the second and third stage polymers have a Tg difference of $\geq$20° C., more preferably $\geq$40° C. and most preferably $\geq$60° C.

Alternatively there is provided a method of preparing an aqueous emulsion of a polymodal multistage polymeric material comprising:
 (i) in a first aqueous emulsion polymerisation stage forming a mixture of monomers and polymerising the mixture to form a first stage polymer with a first Dw and a first Tg; and
 (ii) in a second aqueous emulsion polymerisation stage, forming a mixture of monomers and polymerising the mixture in the presence of the first stage polymer to form a second stage polymer with the same first Dw and a second Tg and when the second stage is preferably substantially complete, introducing a particle size change means for effecting a change in Dw in a subsequent polymerisation; and
 (iii) in a third aqueous emulsion polymerisation stage, forming a mixture of monomers and polymerising the mixture in the presence of the first and second stage polymers to form a third stage polymer with a second smaller Dw in an aqueous emulsion in which the first and second stage polymers have a Tg difference of $\geq$20° C., more preferably $\geq$40° C. and most preferably $\geq$60° C.

It is to be understood that when Dw's and Tg's for polymers formed in separate stages are referred to as being the same, they need not be exactly the same but may vary slightly, for example in the case of Dw by ±45 nm, preferably by ±40 nm, more preferably by ±30 nm, especially by ±20 nm and in the case of Tg the values may vary by ±10° C., preferably by ±5° C. The Dw may vary even if no particle size change means is introduced between two stages, if for example monomers from a subsequent stage with for example a different Tg end up in particles produced during a previous stage (instead of only forming distinct new particles) or if sequential polymers are formed, thus increasing the size of the particles.

It is evident from the foregoing that the multistage polymerisation process to produce the polymodal multistage polymeric material of the invention must have three or more polymerisation stages. A substantially complete polymerisation stage means that at least 70%, preferably 85%, and more preferably 95% of the monomer mixture has been polymerised.

There is further provided according to the invention the use of an aqueous emulsion of a polymodal multistage polymeric material in coating applications, graphic arts applications such as printing inks and overprint lacquers, paint applications and adhesives applications. The aqueous emulsion may also be used as a coating for wood, plastic, metal, leather or concrete.

There is yet further provided according to the invention a polymodal multistage polymeric material derived from an aqueous emulsion as defined above in the form of the binder polymer of an applied coating, an ink coating or overprint lacquer coating, a paint coating or an adhesive coating.

Conventional polymer emulsions having a monomodal particle size distribution generally have a solids content of $\leq$45 wt %. Above 45% solids, the viscosity tends to increase sharply to an unacceptably high value. It is known to achieve high solids content in a polymer emulsion concomitant with acceptably low viscosity by arranging for the polymer to have a polymodal particle size distribution (PSD), i.e. a distribution wherein the particles are of varying size with (or grouped around) two or more distinct maxima in the PSD curve (wt % or intensity=ordinate or y axis; size=abscissa or x axis). For the purposes of this invention a dispersion having a very broad PSD without any discernible maxima (broad gaussian distribution curve) is also considered as having a polymodal PSD. Such polymodal polymers can be prepared using known techniques, either by blending preformed monomodal lattices of different particle size or by various types of in-situ preparation using integrated synthetic procedures where the polymodal PSD may be derived from essentially different polymers of differing size or essentially the same polymer in which the polymerisation has been tailored to result in a polymodal PSD.

Examples of in-situ preparation of polymodal polymer emulsions are described in EP 81083, EP 567811, U.S. Pat. No. 4,254,004, U.S. Pat. No. 4,539,361, DD 274229, U.S. Pat. No. 4,780,503 and DE19642762. For example in EP 81083, two seed lattices are used with different particle size which are reacted further with monomer. In U.S. Pat. No. 4,254,004 a method is described based on a change in feed rate. In U.S. Pat. No. 4,539,361 and EP 567811 a small sized seed latex is added during a conventional emulsion polymerisation, in DD 274229 a non-ionic surfactant is used and in U.S. Pat. No. 4,780,503 an extra shot of anionic surfactant is added during a conventional emulsion polymerisation. In DE19642762 a bimodal PSD is formed by a change in pH during the reaction. However, none of these disclosures address the problem of also achieving good block resistance and low MFFT of the polymer of the aqueous emulsion.

As mentioned above the process of WO96/19536 also addresses this problem, and solves it inter alia by using a multistage polymerisation process to form a polymodal polymer where a first stage polymer has a larger particle size and is followed by the addition of a second polymer monomer feed containing surfactant, so that the particle size of the second stage polymer is changed coincidentally with its formation (when polymerising the second feed) and the second stage polymer can have the same or different Tg in comparison to that of the first stage polymer.

We have now discovered, however that the use of a polymodal PSD in a multistage polymer emulsion, where the particle size and Tg changes are carried out during separate polymerisation stages, allows one to achieve better film formation (better MFFT/block resistance balance) not only in comparison to a corresponding polymer emulsion having a monomodal PSD but surprisingly also in comparison with a multistage polymer emulsion of a polymodal PSD, where the particle size and Tg changes are carried out at the same time (for example as in WO96/19536 discussed above), and this holds both at low emulsion solids content in so far as film formation is concerned as well as at high emulsion solids content—which is surprising. The very much faster drying rate of an aqueous polymodal emulsion is particularly significant, especially in printing ink applications, where the slow drying rate of conventional water-based systems is a serious drawback in comparison to solvent-based systems, especially on non-porous substrates like those derived from polyolefins. Current waterborne systems often involve overlong drying times which of course reduces production speed in the particular coating application being employed. Fast drying times are also beneficial in coating applications, for example when spray coating frames which are stacked after spraying and therefore need fast drying and good blocking properties. Furthermore, some heat-sensitive substrates cannot be coated with conventional waterborne systems because they cannot resist the high drying temperatures which are necessary to obtain the required short drying times.

All these drawbacks of waterborne emulsions discussed above are overcome by the aqueous emulsion of the polymodal multistage polymeric material of the present invention.

By an aqueous emulsion is meant (as is conventional) a dispersion of polymer particles in an aqueous carrier medium in which the dispersed particles are in emulsified form in the carrier medium, usually being of colloidal size, such an emulsion being alternatively known as an aqueous polymer latex. The aqueous carrier medium will be mostly or entirely water, and at least 60% by weight of the carrier medium should be water (preferably at least 80%, more preferably at least 95% by weight). Minor amounts of organic liquids may, however, be present; e.g. up to 40 weight % of the carrier medium could be an organic liquid such as n-propanol, isopropanol or glycols which could for example be added after all the other components of the formulation have been combined. Preferably the aqueous emulsion is cosolvent free.

The polymodal nature of the polymodal multistage polymeric material thus enables one to retain the advantage of high solids with acceptable viscosity. Of course, lower solids contents may be employed if desired, and the polymeric material solids content is usually within the range of from 20 to 70 wt %, more preferably 40 to 70 wt %, and particularly 50 to 65 wt %, based on a total weight of aqueous emulsion.

The viscosity of the aqueous emulsion of the invention at ambient temperature is acceptable even at a high solids content as mentioned above. Preferably an acceptable value of viscosity is considered to be ≦1000 mPas, more preferably ≦500 mPas.

More specifically, illustrations of the possible preparation routes for the aqueous emulsions of the invention are briefly as follows, however it is to be understood that a combination of the routes as well as further additional stages are possible.

Route (i)
Stage 1: prepare a soft polymer with large particles;
stage 2: decrease the particle size to give a soft polymer with small particles;
stage 3: raise the Tg and prepare a composite soft/hard polymer with small particles.

Route (ii)
Stage 1: prepare a hard polymer with large particles;
stage 2: decrease the particle size to give a hard polymer with small particles;
stage 3: lower the Tg and prepare a composite hard/soft polymer with small particles.

Route (iii)
Stage 1: prepare a soft polymer with large particles,
stage 2: raise the Tg and prepare a composite soft/hard polymer with large particles;
stage 3: decrease the particle size to give a hard polymer with small particles.

Route (iv)
Stage 1: prepare a hard polymer with large particles,
stage 2: lower the Tg and prepare a composite hard/soft polymer with large particles;
stage 3: decrease the particle size to give a soft polymer with small particles.

Route (v)
Stage 1: prepare a soft polymer with large particles,
stage 2: raise the Tg to prepare a composite soft/hard polymer with large particles;
stage 3: decrease the particle size and lower the Tg again to prepare a soft polymer with small particles.

Route (vi)
Stage 1: prepare a hard polymer with large particles,
stage 2: lower the Tg to prepare a composite hard/soft polymer with large particles;
stage 3: decrease the particle size and raise the Tg again to prepare a hard polymer with small particles.

Route (vii)
Stage 1: prepare a soft polymer with large particles,
stage 2: decrease the particle size and raise the Tg to prepare a hard polymer with small particles;
stage 3: lower the Tg to prepare a composite hard/soft polymer with small particles.

Route (viii)

Stage 1: prepare a hard polymer with large particles;

stage 2: lower the Tg and decrease the particle size and prepare a soft polymer with small particles;

stage 3: raise the Tg and prepare a composite soft/hard polymer with small particles.

Suitable additional stages include for example a stage 4. For example routes (iii), and (vi) could have an additional stage 4 where the Tg is lowered to give a composite hard/soft polymer with small particles, or routes (iv) and (v) could have an additional stage 4 where the Tg is raised to give a composite soft/hard polymer with small particles.

It will be noted that in the above-described synthetic routes, (i) to (viii) are emulsion polymerisation reactions carried out in several stages (sequential polymerisation). The stages of a sequential polymerisation herein are usually carried out in the same reaction vessel. The % weight of stage 1 based on the weight of the polymodal multistage polymeric material is preferably within the range of from 10% to 80%. Similarly the % weight of stage 2 is preferably 15% to 70%, the % weight of stage 3 and for any additional stages is preferably 10% to 80% as long as the % weight of all stages adds up to 100%.

It is to be understood that the terms soft and hard above in relation to Tg are intended only in a relative sense, the Tg difference between at least two of the stages must be $\geq 20°$ C., more preferably $\geq 40°$ C., most preferably $\geq 60°$ C., where the lower Tg is soft and the higher Tg is hard. Furthermore a soft stage has a Tg<30° C. and a hard stage has a Tg>20° C. When two stages are described as being hard, there can be a difference in Tg between both hard stages, but both are hard (i.e. have a high Tg) with respect to a third soft stage. When two stages are described as being soft, there can be a difference in Tg between both soft stages, but both are soft (i.e. have a low Tg) with respect to a third hard stage.

It is to be understood that the terms large and small above in relation to particle size are intended only in a relative sense (both are small in the sense that they provide polymer emulsions). Furthermore it is to be understood that particle sizes obtained during one polymerisation stage may increase during subsequent polymerisation stages as discussed above. With regard to the polymodal polymeric material, whatever the type of polymodality of the PSD (bimodal, polymodal, broad PSD—a broad PSD is obtained by a gradual change from stage 1 to stage 2, or stage 2 to stage 3), it is preferred that the contribution of particles (irrespective of the number of maxima) of size between 20 and 300 nm is within the range of from 2 to 85 weight %, more preferably from 15 to 60 weight %, based on the total weight of polymeric material. Also preferably, the contribution of particles of size between 150 and 700 nm is within the range of from 15 to 98 weight %, more preferably from 40 to 85 weight % based on the total weight of polymeric material even though the small particles might dominate numerically. Therefore preferably the weight ratio of the large particles to the small particles is within the range of from 15:85 to 98:2, preferably 30:70 to 98:2, more preferably 40:60 to 85:15.

In a particularly preferred embodiment, a polymodal PSD in which two maxima are predominant (i.e. bimodal) is used. In such an embodiment the average particle diameter (i.e. size) Dw of the small particles is preferably from 20 to 300 nm, more preferably from 30 to 180 nm. The average particle diameter Dw of the large particles is preferably from 150 to 700 nm, more preferably from 180 to 500 nm. The difference between the average diameter Dw of the small and large particles is preferably at least 50 nm, preferably at least 80 nm, and more preferably at least 100 nm.

The polymodal multistage polymeric material is preferably derived from the multistage polymerisation of olefinically unsaturated monomers, each polymerisation resulting in either a homopolymer but more often a copolymer. Such polymers are called herein "olefinic polymers" for convenience.

The monomer system used for the preparation of olefinic polymer(s) is any suitable olefinically unsaturated monomer or combination of olefinically unsaturated monomers which is amenable to (co)polymerisation.

Typical acid-bearing olefinically unsaturated monomers include olefinically unsaturated carboxyl-functional monomers such as mono carboxyl-functional acrylic monomers, olefinically unsaturated dicarboxyl bearing monomers and their half esters, and anhydrides thereof; examples include acrylic acid, methacrylic acid, β-carboxyethylacrylate, fumaric acid (and its half ester), itaconic acid (and its half ester), maleic acid (and its half ester), itaconic anhydride (and its half ester), maleic anhydride, acrylic anhydride, and methacrylic anhydride. Sulphonic acid-bearing monomers could also be used, such as vinyl sulphonic acid and styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acid.

Non-acid-bearing hydrophobic olefinically unsaturated monomer(s) which may be homo- or copolymerized include alkylmethacrylates, alkyl acrylates and styrenes; also dienes such as 1,3-butadiene and isoprene, and vinyl esters such as vinyl acetate and vinyl alkanoates. Methacrylates include normal or branched alkyl esters of C1 to C12, especially C1 to C10, alcohols and methacrylic acid (i.e. C1 to C12, especially C1–C10, alkyl methacrylates), such as methyl methacrylate, ethyl methacrylate, n-butyl methacrylate, 2-ethylhexyl methacrylate, n-decyl methacrylate and lauryl methacrylate. Acrylates include normal and branched alkyl esters of C1 to C12, especially C1 to C10, alcohols and acrylic acid (i.e. C1–C12, especially C1–C10, alkyl acrylates), such as methyl acrylate, ethyl acrylate, n-butyl acrylate, n-decyl acrylate and 2-ethylhexyl acrylate. Cycloalkyl (6–12 ring carbons) acrylates and methacrylates such as cyclohexyl acrylate, cyclohexyl methacrylate, isobornyl acrylate and isobornylmethacrylate can be used. Styrenes include styrene itself and the various substituted styrenes, such as methyl styrene, α-methyl styrene, t-butyl styrene, o-, m- and p-methyl styrene and the corresponding ethyl, chloro and bromo styrenes. Olefinically unsaturated nitriles such as acrylonitrile and methacrylonitrile may also be polymerised, as well as olefinically unsaturated halides such as vinyl chloride, vinylidene chloride and vinyl fluoride.

The monomer could optionally includes a hydrophilic non-acid-bearing olefinically unsaturated monomer(s) bearing a non-ionic dispersing group such as a polyethylene oxide chain or a hydroxyalkyl group (usually present at a level of not more than 15 wt %). Examples include hydroxyethyl methacryate, hydroxypropyl methacrylate, polyethyleneglycol acrylate or methacrylate optionally having a capping group such as lower alkyl, e.g. methyl.

A hard stage polymer in some cases is usefully made from an olefinically unsaturated monomer system which comprises at least one of styrene, $C_{1-12}$ especially $C_{1-10}$-alkyl methacrylate(s) (such as methyl methacrylate and ethyl methacrylate) and $C_{1-12}$ especially $C_{1-10}$-alkyl acrylate(s)

(such as ethyl acrylate, n-butyl acrylate and 2-ethylhexylacrylate). The monomer system may contain only one monomer, i.e. the resulting hard stage then essentially being a homopolymer; styrene or methyl methacrylate (alone) for example may be used for the provision of the hard stage. The hard stage however is more usually a copolymer. Di- or poly olefinically unsaturated monomers, such as divinyl benzene, or diacrylates or dimethacrylates like 1,3-butylene glycol diacrylate, may also optionally be employed as part of the monomer system for the hard stage; this will produce a certain amount of crosslinking in the polymer while in the aqueous emulsion (precrosslinking).

The hard stage polymer preferably contains 0 to 15 weight %, more preferably 1 to 10 weight %, most preferably 1.5 to 7 weight % of acid functional olefinically unsaturated monomer(s) as a comonomer(s) (e.g. acrylic or methacrylic acid).

A soft stage polymer in some cases is usefully made from an olefinically unsaturated monomer system which comprises at least one of $C_{1-12}$ especially $C_{1-10}$-alkyl acrylate(s) (such as ethyl acrylate, n-butyl acrylate and 2-ethylhexylacrylate) isobutyl acrylate, methacrylate and esters thereof such as VeoVa 10 available from Shell.

The soft stage polymer preferably contains 0 to 15 weight %, more preferably 1 to 10 weight %, most preferably 1.5 to 7 weight % of acid functional olefinically unsaturated monomer(s) as a comonomer(s) (e.g. acrylic or methacrylic acid).

It will be appreciated that the polymodal multistage polymeric material of the present invention optionally possess functional groups for imparting latent crosslinkability to the aqueous emulsion (for example so that crosslinking takes place after the formation of a coating therefrom) should this be desired. Another is to provide improved wet adhesion in the coating if desired (whereby the polymeric film coating retains its adhesive bond to a substrate under damp or wet conditions). For example, two or more polymers can carry co-reactive groups, e.g. amino groups on one of the polymers and epoxy (e.g. glycidyl) groups on another, or acetoacetoxy or keto or aldehyde carbonyl groups on one of the polymers and amino groups on another, so that a selfcrosslinking (1-pack) system could be envisaged. Alternatively, one or more polymers could carry functional groups such as hydroxyl (e.g. hydroxyethyl and hydroxypropyl) groups and the emulsion may be subsequently formulated with a crosslinking agent such as a polyisocyanate, melamine, or glycouril; or the functional groups on one or more polymers could include keto or aldehyde carbonyl groups and the subsequently formulated crosslinker could be a polyamine or polyhydrazide such as adipic acid dihydrazide; alternatively, one could have zinc-crosslinking, aziridine, epoxy or polycarbodiimide crosslinking of carboxyl groups normally present in the polymeric material.

Other examples of such functional monomers include divinyl benzene, ketofunctional monomers such as vinyl pyrollidone, the acetoacetoxy esters of hydroxyalkyl acrylates and methacrylates such as acetoacetoxyethyl methacrylate, also keto-containing amides such as diacetone acrylamide and aldehyde functional monomers such as methacrolein. Amides such as acrolein acrylamide, methacrylamide, methylolated acrylamide, and methylolated methacrylamide, may also be used. Tertiary amine monomers such as dimethylaminoethylacrylate and wet adhesion promotion monomers such ureido functional monomers for example Norsocryl 104 available from Elf Atochem are useful for providing wet adhesion. It would also be possible to form primary amines in a polymer by iminating carboxyl groups thereof using aziridines such as ethylene imine and propylene imine. Preferably functional monomer(s) are selected from acetoacetoxyethyl methacrylate, glycidyl methacrylate, diacetone acrylamide, dimethylaminoethyl methacrylate, hydroxyethyl methacrylate and/or hydroxyethyl acrylate.

The soft stage polymer may optionally include 0 to 20 weight %, preferably 0 to 8 weight % of non-acid-bearing olefinically unsaturated monomer(s) as described above for imparting latent crosslinkability and/or wet adhesion. The hard stage polymer may also optionally include 0 to 20 weight %, preferably 0 to 8 weight % of non-acid-bearing olefinically unsaturated monomer(s) as described above for imparting latent crosslinkability and/or wet adhesion.

The polymodal multistage polymeric material may be formed by an aqueous emulsion polymerisation process to form aqueous emulsions (latices) thereof. Usually, such an aqueous emulsion polymerisation process is in itself (apart from in-situ sequential techniques as described above to achieve polymodal PSD's) quite conventional and well known and so need not be described in great detail. Suffice to say that such a process involves dispersing the monomer(s) in an aqueous carrier medium and conducting a polymerisation using an emulsifying agent (surfactant) (although sometimes a conventional emulsifying agent is not required), a free-radical initiator (normally water soluble) and (usually) appropriate heating (e.g. 30 to 120° C.) and agitation (stirring) being employed. Also an alkaline solubilised oligomer may be employed as part of the means of stabilisation, examples include Johncryl oligomer available from Johnson and Morez oligomer available from Rohm & Haas/Morton, and alkaline soluble oligomers as taught in patent application WO 96/19536, discussed above for polymodal polymers.

The aqueous emulsion polymerisation can be effected with one or more conventional emulsifying agents (surfactants) [e.g. anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. The alkyl groups in such surfactants (where present) are long chain with for example 8 to 22 carbon atoms. Aryl-containing analogues of the alkyl-containing surfactants are also useful particularly those with alkyl substituted aryl groups such as nonylphenol or triisobutylphenol. Other surfactants include phosphoric acid analogues and phosphates. Non-ionic surfactants include polyglycol ether compounds composed of from 3 to 100 ethylene oxide groups and/or propylene oxide groups linked to long chain alkyl or aryl (particularly alkyl substituted aryl) groups of the type described above. Other anionic surfactants include such alkyl or (alk)aryl groups linked to sulphonic acid groups, sulphuric acid half ester groups (linked in turn to polyglycol ether groups), phosphonic acid groups or carboxylic acid groups. Cationic surfactants include such alkyl or (alk)aryl groups linked to tertiary ammonium salt groups. The products of addition of from 3 to 100 moles of ethylene oxide to nonylphenol or triisobutyl phenol, their sulphuric acid half esters, or their phosphoric acid partial esters are typical of these types of emulsifiers. The amount used is preferably 0 to 7% by weight (if used, preferably 0.01 to 7%, more usually 0.3 to 3%) by weight based on the weight of total monomer(s) charged. The polymerisation can employ conventional free radical initiators e.g. water-soluble peroxy compounds such as hydrogen peroxide, t-butyl-hydroperoxide, cumene hydroperoxide; water-soluble persulphates such as $NH_4$ persulphate, K persulphate and Na persulphate; water-soluble azo compounds such as azo-bis-cyanovaleric acid or its salts. Redox systems may be used formed of an oxidising component, like alkali metal or ammonium persulphate or hydrogen peroxide and a suitable reducing agent, e.g. isoascorbic acid or Na bisulphite. The amount of the total initiator system (i.e. including a reductor if used) is generally within the range of from 0.01% to 4% based on the weight of total monomer(s) charged.

The emulsion polymerisation process may be carried out using an "all-in-one" batch process for each polymerisation stage (i.e. a process in which all the components to be employed in a polymerisation stage are present in the carrier medium at the start of the polymerisation) or a semi-batch process in which one or more of the components employed (usually at least one of the monomers, or the monomer if only one is being polymerised) is wholly or partially fed to the carrier medium during the polymerisation stage. Although not preferred, fully continuous processes could also be used for each polymerisation stage.

The aqueous emulsion of the invention contains at least 50%, preferably 60%, more preferably 75%, most preferably 90% of the polymodal multistage polymeric material. The aqueous emulsion may contain up to 20% more preferably up to 25%, and most preferably up to 30% by weight of other polymers not prepared according to the present invention for example polyesters, polyolefins, polyurethanes and fatty acid modified polymers.

The aqueous emulsion of the invention should preferably possess a relatively low minimum film-forming temperature (MFFT), preferably $\leq 90°$ C. and more preferably within the range of 0 to 40° C. and most preferably in the range of 0 to 20° C. The minimum film forming temperature of the aqueous emulsion of the invention is the temperature where the composition forms a smooth and crack-free coating or film using ASTM D-2354 and when applied using a Sheen MFFT bar SS3000. Coalescing solvent(s) may be incorporated in the case of polymodal multistage polymeric material that does not readily form films at for example low temperatures to lower MFFT and improve film forming, however preferably no coalescing solvents are incorporated.

The aqueous emulsions of the invention may be combined or formulated with other additives or components, such as defoamers, rheology control agents, thickeners, dispersing and stabilising agents (usually surfactants), wetting agents, fillers, extenders, fungicides, bactericides, coalescing solvents, wetting solvents, plasticisers, anti-freeze agents, waxes and pigments.

The aqueous emulsions of the invention may be used for example, appropriately formulated if necessary, for the provision of protective coatings, polishes, varnishes, lacquers (such as waterborne overprint lacquer formulations for the graphic arts market,) paints, sealants and adhesives (for instance pressure sensitive adhesives) or printing inks, in which case they will necessarily be formulated with pigments (e.g. $TiO_2$, or carbon black).

When used for the provision of coatings, the aqueous emulsions of the invention, or formulations based on them, may be applied to various substrates by conventional techniques such as spraying, brushing, flow coating, dipping, and by the various application methods used when applying inks or overprint varnishes to a substrate in printing applications, such as for example flexo and gravure printing, roller coating, air knife coating and off-set printing techniques.

The present invention is now further illustrated, but in no way limited, by reference to the following examples. Unless otherwise specified, all parts, percentages and ratios are on a weight basis. The prefix C before an example number denotes that it is a comparative example.

In the examples, the following abbreviations are used.

| | |
|---|---|
| APS | = ammonium persulphate |
| MMA | = methyl methacrylate |
| MAA | = methacrylic acid |
| IAZ | = iso-ascorbic acid |
| AKYP NLS = Akyposal# NLS (Akyposal# is a Trade Mark of Chemy Ltd.) | = sodium lauryl sulphate |
| TBHPO | = tertiary butylhydroperoxide |
| S | = styrene |
| αMeSt | = α-methyl styrene |
| 2-EHA | = 2-ethylhexyl acrylate |
| PSD | = particle size distribution |
| MFFT | = minimum film forming temperature |
| Dw | = weight average particle diameter |
| Mw | = weight average molecular weight |
| $NaHCO_3$ | = sodium bicarbonate |

In the examples, the following procedures were employed for the measurement of MFFT, viscosity, König Hardness, block resistance and particle size.

MFFT Measurements

Measurements were performed on a Sheen Instruments Ltd, MFFT bar SS-3000. The instrument is designed to permit MFFT measurements according to ASTM D-2354, in which the aqueous emulsion of the invention is cast on the bar or plate with a pre-imposed and equilibrated temperature gradient and dry air flow. The MFFT was determined by visual observation of the transition point (temperature) at which the film changes from a turbid white and/or cracked film into a clear and coherent film.

A 60 μm wet layer of the aqueous emulsion of the invention was cast on the bar after thermal equilibrium of the bar had been achieved. After 30–60 minutes, when complete drying of the film was established, the transition point (MFFT) was determined. The error range of the visual determination of the MFFT was ±0.5° C.

Particle Size

Particle size information herein was determined by Scanning/Transmission Electron Microscope and by Photon Correlation Spectroscopy.

Viscosity:

Viscosities are determined herein with a Brookfield Viscometer using LV spindles at 25° C.-ASTM D-2196.

König Hardness Measurement:

An 80 micron wet film of the aqueous emulsion of the invention to which 10% butyidiglycol is added is cast on to a glass substrate and dried for 16 hours at 52° C. After this time interval the glass plates are removed from the oven and are left to cool down to room temperature (22±2° C.). Then the König Hardness (in seconds) is measured with a König Hardness measurement device from Erichsen according to DIN53157.

Block Resistance Measurement [Includes Blocking and Early Blocking]:

Step 1: Blocking:

A 100 micron wet film of the aqueous emulsion of the invention to which 10% butyidiglycol is added is cast on to a paper substrate and dried for 16 hours at 52° C.

Step 1: Early Blocking:

A 250 micron wet film of the aqueous emulsion of the invention to which 10% butyldiglycol was added, is cast on to a paper substrate and dried for 24 hours at room temperature.

Step 2: Blocking and Early Blocking:

After cooling down to RT two pieces of coated film are placed with the coated side against each other under a load of 1 Kg/cm$^2$ for 4 hours at 52° C. After this time interval the load on the samples is removed and the samples are left to cool down to room temperature (22±2° C.). When the two coatings can be removed from each other without any damage to the film (do not stick) the block resistance is very good and assessed as a 5. When they however completely stick together, block resistance is very bad and assessed as a 0.

EXAMPLES 1 To 5

In these examples an aqueous emulsion of a bimodal multistage polymeric material was prepared by procedures as described below.

The following recipes detailed in Table 1 were employed.

TABLE 1

| No. | Component | Amount (g): Example | | | | |
| --- | --- | --- | --- | --- | --- | --- |
| | | 1 | 2 | 3 | 4 | 5 |
| 1. | Water | 385.2 | 385.2 | 385.2 | 385 | 385 |
| 2. | APS | 0.5 | 0.5 | 0.5 | 0.5 | 0.5 |
| 3. | NaHCO$_3$ | 1.0 | 1.0 | 1.0 | 1.0 | 1.0 |
| 4. | Water | 20.0 | 20.0 | 20.0 | 20.0 | 20 |
| 5. | Water | 64.5 | 96.8 | 64.5 | 64.5 | 161.4 |
| 6. | AKYP NLS | 9.8 | 14.7 | 9.7 | 9.8 | 24.5 |
| 7. | APS | 1.1 | 1.6 | 1.1 | 1.1 | 2.7 |
| 8. | S | 114.1 | 308.2 | 114.2 | 205.4 | 285.5 |
| 9. | 2-EHA | 113.8 | 33.7 | 113.8 | 22.5 | 284.5 |
| 10. | MAA | 7.0 | 10.6 | 7.0 | 7.0 | 17.6 |
| 11. | Water | 192.6 | 161.3 | 96.7 | 192.6 | 64.4 |
| 12. | AKYP NLS | 29.4 | 24.5 | 14.7 | 29.4 | 9.8 |
| 13. | APS | 3.2 | 2.7 | 1.6 | 3.2 | 1.1 |
| 14. | NaHCO$_3$ | 1.5 | 0.0 | 0.15 | 1.5 | 0.2 |
| 15. | S | 342.4 | 285.4 | 308.3 | 342.4 | 114.2 |
| 16. | 2-EHA | 341.3 | 284.4 | 33.7 | 341.3 | 113.8 |
| 17. | MAA | 21.1 | 17.6 | 10.6 | 21.1 | 7.1 |
| 18. | Water | 64.2 | 63.2 | 161.2 | 64.2 | 96.7 |
| 19. | AKYP NLS | 9.8 | 9.8 | 24.5 | 9.8 | 14.7 |
| 20. | APS | 1.1 | 1.1 | 2.7 | 1.1 | 1.6 |
| 21. | NaHCO$_3$ | 0.5 | 2.0 | 0.3 | 0.5 | 0.25 |
| 22. | S | 205.4 | 205.4 | 285.5 | 205.4 | 308.3 |
| 23. | 2-EHA | 22.5 | 22.5 | 284.5 | 22.5 | 33.7 |
| 24. | MAA | 7.0 | 7.0 | 17.6 | 7.0 | 10.6 |
| 25. | Rinse Water | 5.1 | 5.1 | 5.1 | 5.1 | 5.1 |
| 26. | FeSO$_4$ | 0.01 | 0.01 | — | — | — |
| 27. | IAZ | 2.0 | 2.0 | 2.0 | 2.0 | 2.0 |
| 28. | TBHPO 80% | 2.4 | 2.4 | 2.4 | 2.4 | 2.4 |
| 29. | Water | 20.0 | 20.0 | 20.0 | 20.0 | 20.0 |
| 30. | Water | 2.4 | 2.4 | 2.4 | 2.4 | 2.4 |
| 31. | Water for solids correction | 9.0 | 9.0 | 9.0 | 9.0 | 9.0 |
| Total Weight | | 2000 | 2000 | 2000 | 2000 | 2000 |

PROCEDURE FOR EXAMPLE 1

Charge 1 and 2 to the reactor; heat up to 90° C. Then charge 5–10 to a first feed tank and mix until a first stable pre-emulsion is obtained. Start the first feed; this should take 50 min. at 90° C.

When the first feed is completed charge a solution of 3 and 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 5.0 with ammonia (25% in water).

Start the second feed 45 minutes after the end of the first feed, this should take 140 min. at 90° C. Charge 18–24 to a third feed tank and mix until a third stable pre-emulsion is obtained and adjust the third feed to pH 5.0 with ammonia (25% in water).

Start the third feed 45 minutes after the end of the second feed, this should take 50 min. at 90° C. When the third feed is completed rinse with 25 and keep the batch at 90° C. for 30 minutes then cool the batch to 50° C. This is followed by addition of 26–30 to the reactor to perform a post-reaction at 50° C. for 45 min. Then the batch is cooled to room temperature and adjusted to a 60% solids content with 31.

Thus for Example 1, during polymerisation of the first monomer feed (stage 1), low Tg, large particles are formed, then the pH is altered which results in a change in particle size during polymerisation of the second monomer feed (same monomer composition—stage 2) resulting in low Tg, small particles, and subsequently a third monomer feed (different monomer composition—stage 3) is added and polymerised resulting in composite (low/high Tg), small particles. The final product will consist of both large and small composite particles. Material from stage 2 will partly end up in or on the large particles from stage 1 and material from stage 3 will partly end up in the large particles from stage 1 and the small particles from stage 2.

PROCEDURE FOR EXAMPLE 2

Charge 1 and 2 to the reactor; heat up to 90° C. Then charge 5–10 to a first feed tank and mix until a first stable pre-emulsion if obtained. Start the first feed; this should take 70 min. at 90° C.

When the first feed is completed charge a solution of 3 and 4 into the reactor and check the pH. Adjust pH of the reactor phase to pH 7.5 with ammonia (25% in water). Charge 11–17 to a second feed tank and mix until a second stable pre-emulsion is obtained.

Start the second feed 45 minutes after the end of the first feed, this should take 120 min. at 90° C. When the second feed is completed charge a solution of 3 and 4 into the reactor and check the pH. Adjust the pH of the reactor phase to pH 7.5 with ammonia (25% in water). Charge 18–24 to a third feed tank and mix until a third stable pre-emulsion is obtained and adjust the third feed to pH 5.0 with ammonia (25% in water).

Start the third feed 45 minutes after the end of the second feed, this should take 50 min. at 90° C. When the third feed is completed rinse with 25 and keep the batch at 90° C. for 30 minutes then cool the batch to 50° C. This is followed by addition of 26–30 to the reactor to perform a post-reaction at 50° C. for 45 min. Then the batch is cooled to room temperature and adjusted to a 60% solids content with 31.

For Example 2, during polymerisation of the first monomer feed (stage 1), high Tg, large particles are formed, and then a second monomer feed (different monomer composition—stage 2) is added and polymerised resulting in composite (high/low Tg), large particles then the pH is altered which results in a change in particle size during polymerisation of a third monomer feed (different monomer composition—stage 3) resulting in high Tg, small particles.

Material from stage 3 will partly end up in the large composite particles from stage 1 and stage 2 and the small particles are not composites.

PROCEDURE FOR EXAMPLE 3

Charge 1 and 2 to the reactor; heat up to 90° C. Then charge 5–10 to a first feed tank and mix until a first stable pre-emulsion is obtained. Start the first feed; this should take 50 min. at 90° C.

When the first feed is completed charge a solution of 3 in 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 6.0 with ammonia (25% in water).

Start the second feed 45 minutes after the end of the first feed, this should take 70 min. at 90° C. When the second feed is completed keep the batch at 90° C. for 45 minutes.

Charge 18–24 to a third feed tank and mix until a third stable pre-emulsion is obtained and adjust the third feed to pH 6.0 with ammonia (25% in water).

Start the third feed 45 minutes after the end of the second feed, this should take 120 min. at 90° C. When the third feed is completed rinse with 25 and keep the batch at 90° C. for 30 minutes then cool the batch to 50° C. This is followed by addition of 26–29 to the reactor to perform a post-reaction at 50° C. for 45 min. Then the batch is cooled to room temperature and adjusted to a 60% solids content with 30.

For Example 3, during polymerisation of the first monomer feed (stage 1), low Tg, large particles are formed, then the pH is altered which results in a change in particle size during composition, high Tg) resulting in high Tg, small particles. Subsequently a third monomer feed (different composition, low Tg) is added and polymerised resulting in composite (high/low Tg) small particles.

Material from stage 2 will partly end up in the large particles from stage 1 and material from stage 3 will partly end up in the particles from stage 1 and stage 2 resulting in large and small composite particles.

PROCEDURE FOR EXAMPLE 4

Charge 1 and 2 to the reactor; heat up to 90° C. Then charge 5–10 to a first feed tank and mix until a first stable pre-emulsion is obtained. Start the first feed; this should take 50 min. at 90° C.

When the first feed is completed charge a solution of 3 in 4 into the reactor and check the pH. Adjust pH of the reactor phase to pH 7.5 with ammonia (25% in water).

Charge 11–17 to a second feed tank and mix until a second stable pre-emulsion is obtained and adjust the second feed to pH 6.0 with ammonia (25% in water).

Start the second feed 45 minutes after the end of the first feed, this should take 140 min. at 90° C. When the second feed for Example 2 is completed keep the batch at 90° C. for 45 minutes. Charge 18–24 to a third feed tank and mix until a third stable pre-emulsion is obtained and adjust the third feed to pH 6.0 with ammonia (25% in water).

Start the third feed 45 minutes after the end of the second feed, this should take 50 min. at 90° C. When the third feed is completed rinse with 25 and keep the batch at 90° C. for 30 minutes then cool the batch to 50° C. This is followed by addition of 26–29 to the reactor to perform a post-reaction at 50° C. for 45 min. Then the batch is cooled to room temperature and adjusted to a 60% solids content with 30.

For Example 4, during polymerisation of the first monomer feed high Tg, large is particles are formed, then the pH is altered which resulted in a change in particle size during the polymerisation of the second monomer feed (different composition, low Tg) resulting in low Tg small particles. Subsequently a third monomer feed (different composition, high Tg) is added and polymerised resulting on composite (low/high Tg) small particles.

Material from stage 2 will partly end up in the large particles from stage 1 and material from stage 3 will partly end up in the particles from stage 1 and stage 2 resulting in large and small composite particles.

PROCEDURE FOR EXAMPLE 5

Charge 1 and 2 to the reactor; heat up to 90° C. Then charge 5–10 to a first feed tank and mix until a first stable pre-emulsion is obtained. Start the first feed; this should take 120 min. at 90° C.

When the first feed is completed charge a solution of 3 in 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 6.0 with ammonia (25% in water).

Start the second feed 45 minutes after the end of the first feed, this should take 50 min. at 90° C. When the second feed for Example 2 is completed keep the batch at 90° C. for 45 minutes. Adjust the pH of the reactor phase to pH 7.5 with ammonia (25% in water). Charge 18–24 to a third feed tank and mix until a third stable pre-emulsion is obtained and adjust the third feed to pH 6.0 with ammonia (25% in water).

Start the third feed 45 minutes after the end of the second feed, this should take 70 min. at 90° C. When the third feed is completed rinse with 25 and keep the batch at 90° C. for 30 minutes then cool the batch to 50° C. This is followed by addition of 26–29 to the reactor to perform a post-reaction at 50° C. for 45 min. Then the batch is cooled to room temperature and adjusted to a 60% solids content with 30.

Thus for Example 5, during polymerisation of the first monomer feed low Tg, large particles are formed, then the pH is altered which results in a change in particle size during the polymerisation of the second monomer feed (same composition, same low Tg) resulting in low Tg, small particles. Subsequently a third monomer feed (different composition, high Tg) is added and polymerised resulting in composite (low/high Tg) small particles.

Material from stage 2 will partly end up in the large particles from stage 1 and material from stage 3 will partly end up in the particles from stage 1 and stage 2 resulting in large and small composite particles.

The properties of emulsions formed in Examples 1 to 5 are shown below in Table 3.

COMPARATIVE EXAMPLES C1 To C4

In these examples an aqueous emulsion of bimodal multistage polymeric material was prepared by a procedure as described below, where the Tg and particle size change was carried out at the same time.

The following recipes detailed in Table 2 were employed.

TABLE 2

| No. | Component | Amount (g) C1 | Amount (g) C2 | Amount (g) C3 | Amount (g) C4 |
|---|---|---|---|---|---|
| 1. | Water | 385.2 | 385.2 | 385.2 | 385.2 |
| 2. | APS | 0.5 | 0.5 | 0.5 | 0.5 |
| 3. | NaHCO$_3$ | 1.0 | 1.0 | 1.0 | 1.0 |
| 4. | Water | 20.0 | 20.0 | 20.0 | 20.0 |
| 5. | Water | 258.1 | 161.3 | 225.8 | 129.1 |
| 6. | AKYP NLS | 39.2 | 24.5 | 34.3 | 19.6 |
| 7. | APS | 4.3 | 2.7 | 3.7 | 2.1 |
| 8. | S | 456.6 | 513.6 | 399.5 | 410.9 |
| 9. | 2-EHA | 455.1 | 56.2 | 398.2 | 44.9 |
| 10. | MAA | 28.2 | 17.6 | 24.7 | 14.1 |
| 11. | Water | 63.2 | 160.0 | 95.4 | 192.2 |
| 12. | AKYP NLS | 9.8 | 24.5 | 14.7 | 29.4 |
| 13. | APS | 1.1 | 2.6 | 1.6 | 3.2 |
| 14. | NaHCO$_3$ | 2.0 | 2.0 | 2.0 | 2.0 |
| 15. | S | 205.4 | 285.4 | 308.2 | 342.4 |
| 16. | 2-EHA | 22.5 | 284.4 | 33.7 | 341.3 |
| 17. | MAA | 7.0 | 17.6 | 10.6 | 21.1 |
| 18. | Rinse Water | 5.1 | 5.1 | 5.1 | 5.1 |
| 19. | FeSO$_4$ | 0.01 | 0.01 | — | — |
| 20. | IAZ | 2.0 | 2.0 | 2.0 | 2.0 |
| 21. | TBHPO 80% | 2.4 | 2.4 | 2.4 | 2.4 |
| 22. | Water | 20.0 | 20.0 | 20.0 | 20 |
| 23. | Water | 2.4 | 2.4 | 2.4 | 2.4 |
| 24. | Water for solids correction | 9.0 | 9.0 | 9.0 | 9.0 |
| | Total Weight | 2000 | 2000 | 2000 | 2000 |

PROCEDURE FOR COMPARATIVE EXAMPLE 1 (C1)

Charge 1 and 2 to the reactor; heat up to 90° C. Then charge 5–10 to a first feed tank and mix until a first stable pre-emulsion is obtained. Start the first feed; this should take 190 min. at 90° C. When the first feed is completed charge a solution of 3 and 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 5.0 with ammonia (25% in water). Start the second feed 45 minutes after the end of the first feed, this should take 50 min. at 90° C. When the feed is completed rinse with 18 and keep the batch at 90° C. for 30 minutes then cool the batch to 50° C. This is followed by addition of 19–23 to the reactor to perform a post-reaction at 50° C. for 45 min. Then the batch is cooled to room temperature and adjusted to a 60% solids content with 24.

Thus for C1, during polymerisation of the first monomer feed (stage 1), low Tg, large particles are formed, then the pH is altered simultaneously with a change in monomer feed (different monomer composition—stage 2), which results in a change in particle size during polymerisation of the second monomer feed resulting in high Tg, small particles.

PROCEDURE FOR COMPARATIVE EXAMPLE 2 (C2)

Charge 1 and 2 to the reactor; heat up to 90° C. Then charge 5–10 to a first feed tank and mix until a first stable pre-emulsion is obtained. Start the first feed; this should take 120 min. at 90° C. When the first feed is completed charge a solution of 3 and 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 5.0 with ammonia (25% in water). Start the second feed 45 minutes after the end of the first feed, this should take 120 min. at 90° C. When the feed is completed rinse with 18 and keep the batch at 90° C. for 30 minutes then cool the batch to 50° C. This is followed by addition of 19–23 to the reactor to perform a post-reaction at 50° C. for 45 min. Then the batch is cooled to room temperature and adjusted to a 60% solids content with 24.

Thus for C2, during polymerisation of the first monomer feed (stage 1), high Tg, large particles are formed, then the pH is altered simultaneously with a change in monomer feed (different monomer composition—stage 2), which results in a change in particle size during polymerisation of the second monomer feed resulting in low Tg, small particles. In both examples C1 and C2, material from the second monomer feed will partly end up with the large particles, making the large particles composites.

PROCEDURE FOR COMPARATIVE EXAMPLE 3 (C3)

Charge 1 and 2 to the reactor; heat up to 90° C. Then charge 5–10 to a first feed tank and mix until a first stable pre-emulsion is obtained. Start the first feed; this should take 170 min. at 90° C. When the first feed is completed charge a solution of 3 and 4 into the reactor and check the pH. Adjust the pH of the reactor phase to pH 7.5 with ammonia (25% in water). Charge 11–17 to a second feed tank and mix until a second stable pre-emulsion is obtained and adjust the second feed to pH 6.0 with ammonia (25% in water). Start the second feed 45 minutes after the end of the first feed, this should take 70 min. at 90° C. When the feed is completed rinse with 18 and keep the batch at 90° C. for 30 minutes then cool the batch to 50° C. This is followed by addition of 19–23 to the reactor to perform a post-reaction at 50° C. for 45 min. Then the batch is cooled to room temperature and adjusted to a 60% solids content with 24.

Thus for C3 during polymerisation of the first monomer feed, low Tg large particles are formed, then the pH is altered simultaneously with a change in monomer composition (to a low Tg) resulting in high Tg, small particles.

Material from stage 2 will partly end up in the large particles from stage 1, making the large particles composites.

PROCEDURE FOR COMPARATIVE EXAMPLE 4 (C4)

Charge 1 and 2 to the reactor; heat up to 90° C. Then charge 5–10 to a first feed tank and mix until a first stable pre-emulsion is obtained. Start the first feed; this should take 100 min. at 90° C. When the first feed is completed charge a solution of 3 and 4 into the reactor and check the pH. Adjust pH of the reactor phase to pH 7.5 with ammonia (25% in water). Charge 11–17 to a second feed tank and mix until a second stable pre-emulsion is obtained and adjust the second feed to pH 6.0 with ammonia (25% in water). Start the second feed 45 minutes after the end of the first feed, this should take 140 min. at 90° C. When the feed is completed rinse with 18 and keep the batch at 90° C. for 30 minutes then cool the batch to 50° C. This is followed by addition of 19–23 to the reactor to perform a post-reaction at 50° C. for 45 min. Then the batch is cooled to room temperature and adjusted to a 60% solids content with 24.

Thus for C4, during polymerisation of the first feed, high Tg, large particles are formed, then the pH is altered simultaneously with a change in monomer composition (to a low Tg) resulting in low Tg, small particles.

Material from stage 2 will partly end up in the large particles from stage 1, making the large particles composites.

The properties of emulsions formed in Comparative Examples C1 to C4 are shown below in Table 3.

As can be seen from the results in Table 3, the best low MFFT and good blocking combination is achieved when at least one particle size change is carried out at a separate stage to at least one Tg change.

TABLE 3

|  | Example 1 | Example 2 | Example 3 | Example 4 | Example 5 | Example C1 | Example C2 | Example C3 | Example C4 |
|---|---|---|---|---|---|---|---|---|---|
| Tg ° C. [for each stage] | 10/10/80 | 80/10/80 | 10/80/10 | 80/10/80 | 10/10/80 | 10/80 | 80/10 | 10/80 | 80/10 |
| Phase ratio % | 20/60/20 | 30/50/20 | 20/30/50 | 20/60/20 | 50/20/30 | 80/20 | 50/50 | 70/30 | 40/60 |
| Dw/Tg change | Dw after stage 1 Tg after stage 2 | Tg after stage 1 Dw and Tg after stage 2 | Dw and Tg after stage 1 Tg after stage 2 | Dw and Tg after stage 1 Tg after stage 2 | Dw after stage 1 Tg after stage 2 | Dw and Tg at the same time after stage 1 | Dw and Tg at the same time after stage 1 | Dw and Tg at the same time after stage 1 | Dw and Tg at the same time after stage 1 |
| solids % | 59.0 | 59.4 | 60.6 | 59.4 | 59.9 | 60.0 | 59.1 | 59.6 | 59.2 |
| pH | 7.0 | 7.5 | 7.2 | 7.3 | 7.1 | 7.0 | 7.2 | 7.3 | 7.9 |
| viscosity mPas | 390 | 168 | 1070 | 238 | 192 | 190 | 170 | 145 | 236 |
| Dw (by TEM) of large and small particles | 350 nm 150 nm | 350 nm 80 nm | 375 nm 125 nm | 340 nm 200 nm | 320 nm 80 nm | 320 nm 80 nm | 350 nm 80 nm | 350 nm 175 nm | 350 nm 200 nm |
| MFFT ° C. | 14 | 40 | 13 | 29 | 19 | 14 | 80 | 15 | 69 |
| König Hardness | 52 | 103 | 29 | 63 | 39 | 64 | 97 | 39 | 60 |
| Early blocking | — | — | 4 | 2 | 0 | — | — | 0 | 0 |
| Blocking | 4/5 | 4/5 | 4 | 5 | 4 | 0 | 5 | 0 | 5 |

Key: 0 = poor 5 = good — = not measured

What is claimed is:

1. A multistage method of preparing an aqueous emulsion of a polymodal polymeric material, comprising the steps of:
   (i) forming a first polymer in a first polymerization stage of the multistage polymerization process;
   (ii) forming a second polymer in a second polymerization stage of the multistage polymerization process, wherein the first and second polymers have a glass transition temperature (Tg) difference of $\geq 20°$ C.; and
   (iii) forming a third polymer in a third polymerization stage of the multistage polymerization process, wherein the second and third polymers have a weight average particle size (Dw) differing by $\geq 50$ mm.

2. The method according to claim 1, wherein the difference in Dw is formed by adding a surfactant, changing the pH, adding a small sized seed lattice, changing the feed rate, or a combination thereof.

3. A method of preparing an aqueous polymeric emulsion, comprising the steps of:
   (i) forming a mixture of monomers in a first aqueous emulsion polymerization stage, polymerizing the mixture to form a first stage polymer having particles with a first Dw and a first Tg, and, when the first stage is substantially complete, introducing a particle size change means for effecting a change of Dw in the subsequent polymerization;
   (ii) forming a mixture of monomers in a second aqueous emulsion polymerization stage, polymerizing the mixture in the presence of the first stage polymer to form a second stage polymer having a second, smaller Dw differing from the first Dw by $\geq 50$ nm, and a Tg which is the same or different from that of the first stage polymer; and
   (iii) forming a mixture of monomers in a third aqueous emulsion polymerization stage and polymerizing the mixture in the presence of the first and second stage polymers to form a third stage polymer, wherein the second and third stage polymers have a Tg difference of $\geq 20°$ C.

4. A method of preparing an aqueous polymeric emulsion, comprising the steps of:
   (i) forming a mixture of monomers in a first aqueous emulsion polymerization stage and polymerizing the mixture to form a first stage polymer with a first Dw and a first Tg;
   (ii) forming a mixture of monomers in a second aqueous emulsion polymerization stage, polymerizing the mixture in the presence of the first stage polymer to form a second stage polymer with the same first Dw and a second Tg differing from the first Tg by $\geq 20°$ C., and, when the second stage is substantially complete, introducing a particle size change means for effecting a change in Dw in the subsequent polymerization; and
   (iii) forming a mixture of monomers in a third aqueous emulsion polymerization stage and polymerizing the mixture in the presence of the first and second stage polymers to form a third stage polymer with a second smaller Dw differing from the first Dw by $\geq 50$ nm.

5. The method according to claim 1, wherein the Tg difference between the first and second polymers is $\geq 40°$ C.

6. The method according to claim 5, wherein the Tg difference is $>60°$ C.

7. The method according to claim 1, said Dw difference between the second and third polymers is $\geq 80$ nm.

8. The method according to claim 7, wherein the Dw difference is $>100$ nm.

9. The method according to claim 1, wherein the polymeric material has a weight average molecular weight (Mw) of ≧50,000 g/mol.

10. The method according to claim 1, wherein the polymeric material has a bimodal particle size distribution.

11. The method according to claim 1, wherein the Dw of the second polymer ranges from 20 to 300 nm, the Dw of the third polymer ranges from 150 to 700 nm, and the Dw difference is ≧50 μm.

12. The method according to claim 11, wherein the Dw of the second polymer ranges from 30 to 180 nm, the Dw of the third polymer ranges from 180 to 500 nm, and the Dw difference is ≧100 nm.

13. The method according to claim 1, wherein the weight ratio of the third polymer to the second polymer ranges from 15:85 to 98:2.

14. The method according to claim 1, wherein the polymeric material solids content of the aqueous emulsion ranges from 20 to 70 weight %, based on total weight.

15. The method according to claim 1, wherein the viscosity of the aqueous emulsion is ≧1000 nmPas at ambient temperature.

16. The method according to claim 1, wherein the forming of a polymer in one or more of the polymerization stages comprises the addition of at least one non acid bearing function monomer that provides latent crosslinkability and improved wet adhesion in the resulting polymer.

17. The method according to claim 16, wherein the functional monomer is selected from the group consisting of acetoacetoxyethyl methacrylate, glycidyl methacrylate, diacetone, acrylamide, dimethylamonoethyl methacrylate, hydroxyethyl methacrylate, and hydroxyethyl acrylate.

18. A method of using an aqueous emulsion, comprising the steps of:
  (i) forming an aqueous emulsion according to the method of claim 1, and
  (ii) applying the aqueous emulsion in a coating application, a graphic arts application, a printing ink, a ink jet ink, an overprint lacquer, a paint application, or an adhesive application.

19. A method of using an aqueous emulsion, comprising the steps of:
  (i) forming an aqueous emulsion according to the method of claim 1, and
  (ii) applying the aqueous emulsion on substrate selected from the group consisting of wood, plastic, metal, leather, and concrete.

* * * * *

UNITED STATES PATENT AND TRADEMARK OFFICE
CERTIFICATE OF CORRECTION

PATENT NO. : 6,992,121 B1
DATED : January 31, 2006
INVENTOR(S) : Peters et al.

It is certified that error appears in the above-identified patent and that said Letters Patent is hereby corrected as shown below:

Column 19,
Line 54, replace "(Dw) differing by $\geq$ 50 mm" with -- (Dw) differing by $\geq$ 50 nm --.

Column 20,
Line 63, replace "difference is > 60° C" with -- difference is $\geq$ 60° C. --.
Line 67, replace "difference is > 100 nm" with -- difference is $\geq$ 100 nm --.

Column 21,
Line 9, replace "difference is $\geq$ 50 μm" with -- difference is $\geq$ 50 nm --.
Lines 20-21, replace "viscosity of the aqueous emulsion is $\geq$ 1000 nmPas" with
-- viscosity of the aqueous emulsion is $\leq$ 1000 mPas --.

Signed and Sealed this

Twenty-third Day of May, 2006

JON W. DUDAS
*Director of the United States Patent and Trademark Office*